United States Patent
Takikawa et al.

(10) Patent No.: US 9,821,660 B2
(45) Date of Patent: Nov. 21, 2017

(54) DISPLAY SYSTEM

(71) Applicant: DENSO CORPORATION, Kariya, Aichi-pref. (JP)

(72) Inventors: Hiroya Takikawa, Kariya (JP); Takeshi Kawashima, Nisshin (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 14/149,918

(22) Filed: Jan. 8, 2014

(65) Prior Publication Data
US 2014/0203928 A1     Jul. 24, 2014

(30) Foreign Application Priority Data
Jan. 18, 2013 (JP) .................................. 2013-7480

(51) Int. Cl.
    *B60Q 1/00*     (2006.01)
    *B60K 37/02*     (2006.01)
    *B60K 35/00*     (2006.01)

(52) U.S. Cl.
CPC ............. *B60K 37/02* (2013.01); *B60K 35/00* (2013.01); *B60K 2350/2013* (2013.01); *B60K 2350/965* (2013.01)

(58) Field of Classification Search
CPC .. B60K 37/02; B60K 35/00; B60K 2350/965; B60K 2350/2013
USPC .......................................................... 340/462
See application file for complete search history.

(56) References Cited

U.S. PATENT DOCUMENTS

| | | | |
|---|---|---|---|
| 6,546,263 B1 * | 4/2003 | Petty ................. | H04M 1/72519 345/158 |
| 8,368,525 B2 * | 2/2013 | Stern .................... | G06Q 10/107 340/500 |
| 2002/0052686 A1 | 5/2002 | Todoriki | |
| 2005/0289015 A1 * | 12/2005 | Hunter ................... | G06Q 30/02 705/26.1 |

(Continued)

FOREIGN PATENT DOCUMENTS

| | | |
|---|---|---|
| JP | 2001-133292 A | 5/2001 |
| JP | 2002-277258 A | 9/2002 |

(Continued)

OTHER PUBLICATIONS

Office Action mailed Nov. 18, 2014 issued in corresponding JP patent application No. 2013-007480 (and English translation).

(Continued)

*Primary Examiner* — Hai Phan
*Assistant Examiner* — Zhen Y Wu
(74) *Attorney, Agent, or Firm* — Posz Law Group, PLC

(57) ABSTRACT

A display system equipped to a vehicle includes a display screen, a notification section, a determination section, and a display control section. The display screen displays information for a vehicle occupant. The notification section preliminarily notifies the vehicle occupant of an information update to be performed on the display screen. The determination section determines whether the vehicle occupant pays attention to the display screen after the notification section notifies of the information update. The display control section performs the information update in order to display new information on the display screen when the determination section determines that the vehicle occupant pays attention to the display screen.

6 Claims, 6 Drawing Sheets

(56) References Cited

U.S. PATENT DOCUMENTS

| | | |
|---|---|---|
| 2010/0026707 A1 | 2/2010 | Hoogenstraaten et al. |
| 2010/0222957 A1 | 9/2010 | Ohta et al. |
| 2011/0286420 A1* | 11/2011 | Cho .................... H04W 74/004 370/329 |
| 2011/0314496 A1* | 12/2011 | Di Mattia .......... H04N 21/2362 725/36 |
| 2012/0050138 A1* | 3/2012 | Sato ....................... B60K 35/00 345/4 |
| 2012/0215403 A1* | 8/2012 | Tengler ................ B60W 50/12 701/36 |
| 2012/0242509 A1* | 9/2012 | Munehiro ............ G08G 5/0021 340/963 |
| 2013/0057668 A1* | 3/2013 | Kim ........................ A61B 5/18 348/77 |
| 2013/0085860 A1* | 4/2013 | Summers ............... G06Q 30/02 705/14.58 |
| 2013/0115875 A1* | 5/2013 | Lee ......................... H04M 1/67 455/26.1 |
| 2013/0159869 A1* | 6/2013 | Faraji .................... G06Q 50/00 715/738 |
| 2013/0307975 A1* | 11/2013 | Ford ........................ B60Q 1/00 348/143 |
| 2014/0052330 A1* | 2/2014 | Mitchell .................. G06F 8/65 701/31.5 |

FOREIGN PATENT DOCUMENTS

| | | |
|---|---|---|
| JP | 2005-326292 A | 11/2005 |
| JP | 2006-248349 A | 9/2006 |
| JP | 2010-039866 A | 2/2010 |
| JP | 2010-223826 A | 10/2010 |
| JP | 4701594 B2 | 6/2011 |
| JP | 2012-068818 A | 4/2012 |
| JP | 2012-096670 A | 5/2012 |

OTHER PUBLICATIONS

Office Action mailed Mar. 24, 2015 issued in corresponding JP patent application No. 2013-007480 (and English translation).

* cited by examiner

DISPLAY SYSTEM

CROSS REFERENCE TO RELATED APPLICATION

This application is based on Japanese Patent Application No. 2013-007480 filed on Jan. 18, 2013, the disclosure of which is incorporated herein by reference.

TECHNICAL FIELD

The present disclosure relates to a display system equipped to a vehicle.

BACKGROUND

A well-known in-vehicle display system notifies a user an information update on a display screen by outputting a sound. Thus, the user, such as a driver, may notice updated information displayed on the display screen. Further, as disclosed in JP 2012-068818 A, an in-vehicle display system performs multiple notifications for the same information so that the driver is notified of the updated information when the driver missed a chance to notify the updated information after the information is updated.

In the above-described display system, the same information is displayed on the display screen multiple times by the multiple notifications. That is, multiple display windows indicating the same information are displayed on the display screen. In this configuration, a position of each display window is shifted from one another. As a result, large part of the display screen is occupied by the multiple display windows, which indicate the same information. In this configuration, since large part of the display screen is occupied by the multiple display windows indicating the same information, different information may fail to be displayed on the display screen and fail to be notified to the user,

SUMMARY

In view of the foregoing difficulties, it is an object of the present disclosure to provide a display system, which restricts a difficulty for a vehicle occupant in noticing updated information displayed on a display screen when the vehicle occupant misses a chance to notice information update performed on the display screen.

According to an aspect of the present disclosure, a display system equipped to a vehicle includes a display screen, a notification section, a determination section, and a display control section. The display screen displays information for a vehicle occupant. The notification section preliminarily notifies the vehicle occupant of an information update to be performed on the display screen. The determination section determines whether the vehicle occupant pays attention to the display screen after the notification section notifies of the information update. The display control section performs the information update in order to display new information on the display screen when the determination section determines that the vehicle occupant pays attention to the display screen.

With the above system, when the vehicle occupant misses a chance to notice the information update performed on the display screen, a difficulty in noticing updated information displayed on the display screen is restricted.

According to another aspect of the present disclosure, a display system equipped to a vehicle includes a display screen, a display control section, a notification section, and a setting section. The display screen displays information for a vehicle occupant. The display control section performs an information update in order to display new information on the display screen. The notification section preliminarily notifies the vehicle occupant of the information update to be performed on the display screen by the display control section. The setting section sets a standby time for the new information. The standby time varies according to a type of the new information. When the standby time set for the new information elapses after the notification section starts notifying of the information update, the display control section performs the information update and displays the new information on the display screen.

With the above system, when the vehicle occupant misses a chance to notice the information update performed on the display screen, a difficulty in noticing updated information displayed on the display screen is restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments of the present disclosure with reference to accompanying drawings.

(First Embodiment)

Figure 1:
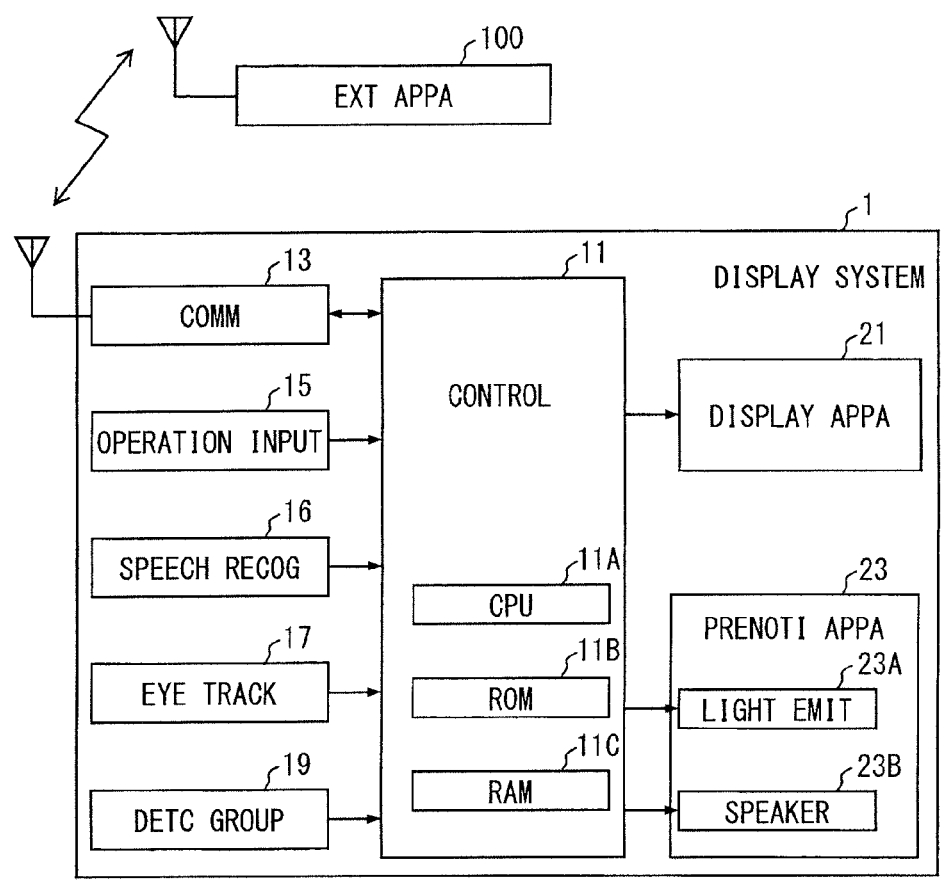
FIG. 1 is a block diagram showing a configuration of a display system according to an embodiment of the present disclosure.

A display system 1 according to the present embodiment is equipped to a vehicle, such as a four-wheeled vehicle, and displays a plurality of information to a vehicle occupant, such as a driver. As shown in FIG. 1, the display system 1 includes a control apparatus (CONTROL) 11, a communication apparatus (COMM) 13, an operation input apparatus (OPERATION INPUT) 15, a speech recognition apparatus (SPEECH RECOG) 16, an eye tracking apparatus (EYE TRACK) 17, a detection device group (DETC GROUP) 19 that detects various vehicle states, a display apparatus (DISPLAY APPA) 21, and a prenotification apparatus (PRENOTI APPA) 23.

The control apparatus 11 includes a central processing unit (CPU) 11A, a read only memory (ROM) 11B, and a random access memory (RAM) 11C. The CPU 11A executes various programs in order to perform various processes. The ROM 11B is provided by a non-volatile memory and stores the programs executed by the CPU 11A. For example, the ROM 11B may be provided by an electrically rewritable non-volatile memory, such as a flash memory. The RAM 11C provides a working memory area for the CPU 11A so that the CPU 11A executes the program stored in the ROM 11B. The CPU 11A executes a program stored in the ROM 11B so that the control apparatus 11 performs a display control to the display apparatus 21.

The communication apparatus 13 communicates with an external apparatus (EXT APPA) 100 via a wireless communication. For example, the communication apparatus 13 receives traffic information, weather information, and emergency disaster information, such as earthquake information, from a distributing center. Herein, the distributing center functions as the external apparatus 100. Then, the communication apparatus 13 transmits the multiple kinds of information to the control apparatus 11. In another example, the control apparatus 11 may control the communication apparatus 13 to access a mail server, which functions as the external apparatus 100, and receive electronic mails addressed to a predetermined mail address defined by the mail server. Then, the control apparatus 11 may control the communication apparatus 13 to transmit the electronic mails, which are received from the mail server, to the control apparatus 11.

The communication apparatus 13 may be configured to perform a cellular communication. For example, the communication apparatus 13 may communicate with the external apparatus 100, such as the mail server, via a cellular communication network. In another example, the communication apparatus 13 may be configured to wirelessly communicate with a mobile phone carried into a compartment of the vehicle. In this case, the mobile phone functions as the external apparatus 100. When the communication apparatus 13 wirelessly communicates with the mobile phone, the communication apparatus 13 receives information, such as above-described traffic information, incoming calls, and incoming mail history, from the mobile phone. Then, the communication apparatus 13 transmits the information received from the mobile phone to the control apparatus 11.

Further, the communication apparatus 13 may be configured to wirelessly communicate with the mobile phone and further communicate with the external apparatus 100 using a tethering function of the mobile phone. In this case, the mobile phone may be provided by a smart phone and is carried into the compartment of the vehicle, and the external apparatus 100 is an apparatus other than the mobile phone carried into the compartment of the vehicle. The communication apparatus 13 may also be configured to wirelessly communicate with a roadside device in order to communicate with the external apparatus 100.

The operation input apparatus 15 receives an operation or a manipulation from a user, such as the driver. When the operation input apparatus 15 receives the operation from the user, the operation input apparatus 15 transmits a signal indicating the operation to the control apparatus 11. For example, the operation input apparatus 15 may include a mechanical button arranged on a steering wheel of the vehicle. When the mechanical button is manipulated by the user, the operation input apparatus 15 transmits a signal indicating the manipulation to the control apparatus 11. For another example, the operation input apparatus 15 may be provided by a remote controller or a touch panel. Further, the operation input apparatus 15 may be provided by a structure or a device different from above-described examples.

The speech recognition apparatus 16 recognizes a speech made by the user by analyzing an input signal from a microphone, and transmits analyzed words of the speech to the control apparatus 11. The eye tracking apparatus 17 detects a line of sight of the driver by analyzing an image of the driver taken by a camera. Then, the eye tracking apparatus 17 transmits information related to the detected line of sight of the driver to the control apparatus 11.

The detection device group 19 includes multiple devices, each of which detects a vehicle state. The detection device group 19 includes, for example, a device detecting a speed of the vehicle, a device detecting an engine speed, a device detecting a water temperature, a device detecting a battery voltage, a device detecting amount of remaining fuel, a device detecting turning on and turning off of a direction indicator, a device detecting a shift position. Each device included in the detection device group 19 transmits a signal indicating the vehicle state to the control apparatus 11.

The display apparatus 21 includes a display screen 21A provided by, such as a liquid crystal display (LCD) screen. The control apparatus 11 controls the display apparatus 21 to display information for the driver on the LCD screen 21A. The LCD screen 21A may be mounted to an instrument panel disposed in front of a driver seat.

Figure 2:
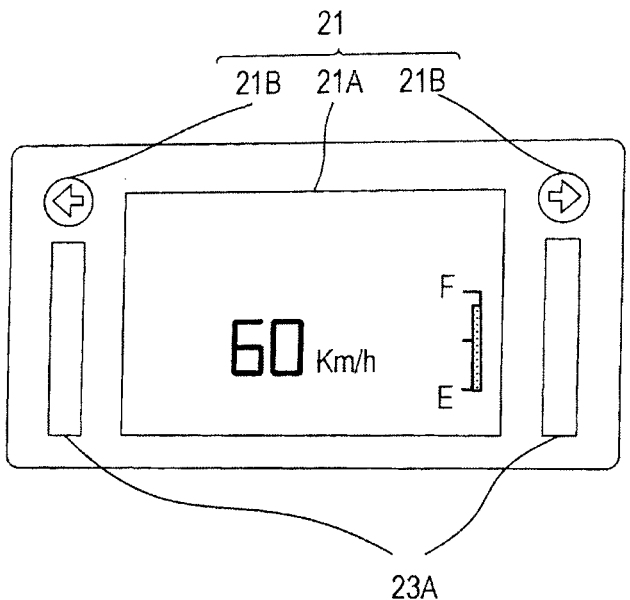
FIG. 2 is a diagram showing periphery devices of a display screen included in the display system.

As shown in FIG. 2, the LCD screen 21A displays vehicle speed and amount of remaining fuel as the information for the driver. The display apparatus 21 may further includes direction indicator displays 21B that are disposed on the instrument panel. The direction indicator display 21B notifies a turning on and a turning off the direction indicator.

The control apparatus 11 controls the prenotification apparatus 23 to preliminarily notify the user of information update on the LCD screen 21A before the information update is being executed. That is, the prenotification apparatus 23 notifies the driver that the information displayed on the LCD screen 21A is going to be updated after a moment. Hereinafter, the information displayed or to be displayed on the LCD screen 21A is also referred to as display information. As shown in FIG. 3B, the LCD screen 21A displays new information received from the external apparatus 100. The prenotification apparatus 23 performs a prenotification of the new information received from the external apparatus 100 to the user.

The prenotification apparatus 23 according to the present embodiment includes a light emitting unit (LIGHT EMIT) 23A and a speaker 23O. For example, as shown in FIG. 2, the light emitting unit 23A may be arranged around the LCD screen 21A. The prenotification apparatus 23 performs a prenotification of the information update by turning on the light emitting unit 23A to emit light or turning on the speaker 23O to output a sound. Herein, the information update is an update of a display window on the LCD screen 21A. For example, the new information may be displayed on the present display window in an overlapped manner as shown in FIG. 3O. Further, the new information may be displayed in a display window separated from the present display window, or the present display window may be switched to a new display window showing the new information.

Figure 3A:
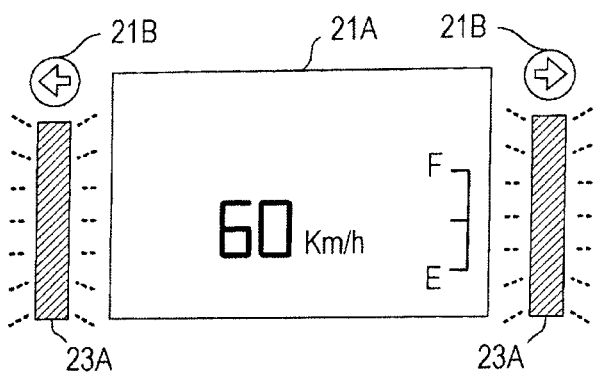
FIG. 3A is a diagram showing a state in which a prenotification is being performed.
Figure 3B:
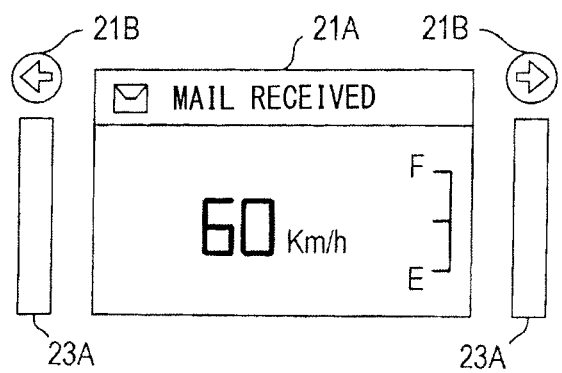
FIG. 3B is a diagram showing information update on the display screen after the prenotification is performed.

In the present embodiment, when the communication apparatus 13 receives, from the external apparatus 100, the new information to be displayed on the LCD screen 21A, the light emitting unit 23A emits light as shown in FIG. 3A in order to prenotify the driver of the new information. Hereinafter, the new information, which is received from the external apparatus 100 and to be displayed on the LCD screen 21A, is also referred to as display object information. At the same time, the speaker 23B outputs a notification sound, such as a beep sound, in order to notify the user of a receipt of the display object information from the external apparatus 100.

After the prenotification of the receipt of the display object information from the external apparatus 100 as shown in FIG. 3A, the LCD screen 21A displays the display object information as shown in FIG. 3B. In FIG. 3B, a message "Mail Received" is displayed on an upper portion of the display window of the LCD screen 21A in an overlapped manner as an example.

The display system 1 according to the present embodiment controls an update timing of the new information on the LCD screen 21A in order to notify the information update on the LCD screen 21A to the user in a easy to understand way. Herein, the update timing of the new information to be displayed on the LCD screen 21A is a display timing of the new information received from the external apparatus 100.

Figure 4:
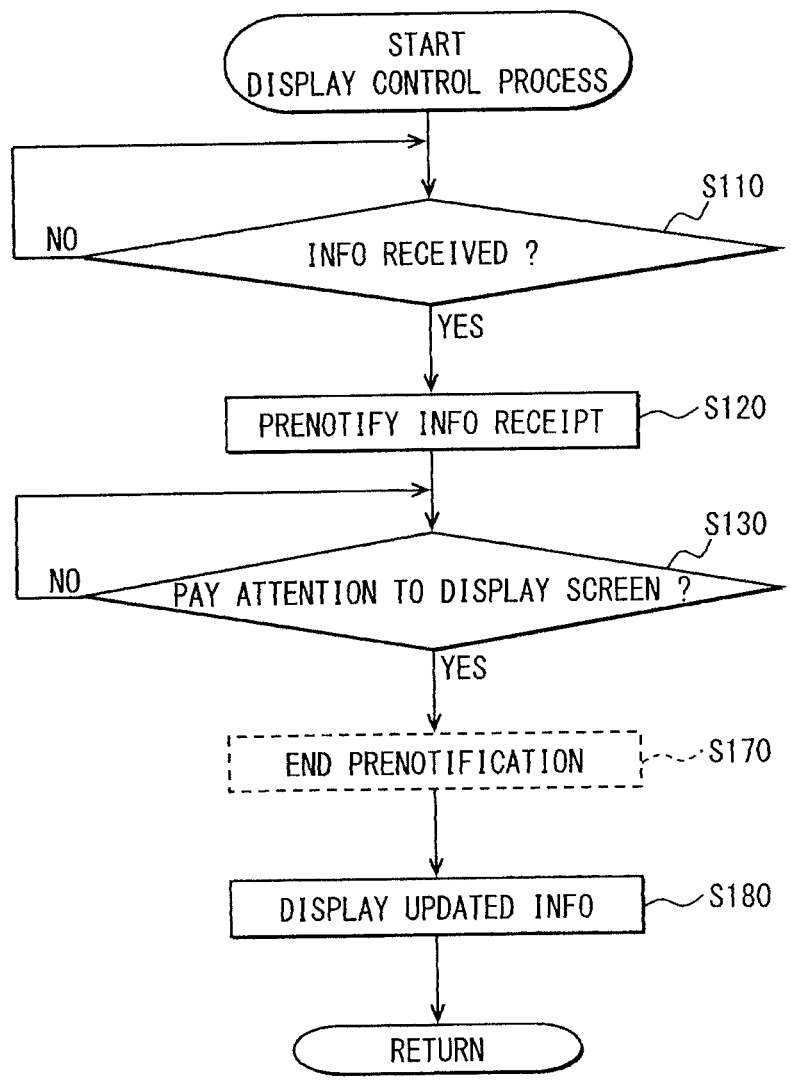
FIG. 4 is a flowchart showing a display control process executed by a control apparatus of a display system according to a first embodiment of the present disclosure.

The following will describe a display control process repeatedly executed by the control apparatus 11 of the display system 1 according to the present embodiment with reference to FIG. 4. The control apparatus 11 executes the display control process in order to display the new information received from the external apparatus 100 on the LCD screen 21A.

As shown in FIG. 4, when the control apparatus 11 starts the display control process, the control apparatus 11 is in a standby state until the control apparatus 11 receives the display object information (INFO) from the external apparatus 100 via the communication apparatus 13. At S110, the control apparatus 11 may send an inquiry of an existence of new display object information to the external apparatus 100 via the communication apparatus 13 in order to receive the new display object information. Further, the control apparatus 11 may wait until the new display object information is transmitted from the external apparatus 100 without sending the inquiry to the external apparatus 100. The display object information may include above-described traffic information, weather information, emergency disaster information, such as earthquake information, and electronic mails. The traffic information may include congestion information, traffic accident information, and traffic regulation information.

At S110, when the control apparatus 11 receives the new display object information, the control apparatus 11 controls the prenotification apparatus 23 to preliminarily notify the user that the information update is going to be performed on the LCD screen 21A at 5120. That is, the control apparatus 11 controls the prenotification apparatus 23 to perform the prenotification in order to notify the user that the display window of the LCD screen 21A is going to be updated. Specifically, the control apparatus 11 controls the prenotification apparatus 23 to turn on the light emitting unit 23A and the speaker 235 so that the light emitting unit 23A emits light and the speaker 235 outputs the notification sound. The turning on of the light emitting unit 23A and the speaker 23B is also referred to as prenotification operation.

After turning on the light emitting unit 23A and the speaker 23B, the control apparatus 11 proceeds to S130 with the light emitting unit 23A being turned on. The speaker 23B is configured to be turned off after a predetermined time period. At S130, the control apparatus 11 determines whether the driver is paying attention to the LCD screen 21A based on position information of the line of sight of the driver transmitted from the eye tracking apparatus 17.

At S130, when the control apparatus 11 determines that the driver is not paying attention to the LCD screen 21A (S130: NO), the control apparatus 11 repeatedly executes S130 until the driver pays attention to the LCD screen 21A. When the control apparatus 11 determines that the driver is paying attention to the LCD screen 21A (S130: YES), the control apparatus 11 turns off the light emitting unit 23A at S170. That is, the control apparatus 11 controls the prenotification apparatus 23 to end the prenotification operation at S170. The speaker 23B outputs the above-described notification sound for the predetermined time period. That is, the speaker 23B does not continue outputting the notification sound until the driver pays attention to the LCD screen 21A.

At S180, the control apparatus 11 controls the LCD screen 21A to update the display information so that the new display object information is displayed on the display window of the LCD screen 21A as shown in FIG. 3B. The control apparatus 11 may control the LCD screen 21A to maintain the new display object information on the display window until the LCD screen 21A is required to display the next display object information (S180) in the next display control process. Further, the control apparatus 11 may control the LCD screen 21A to display the new display object information for a predetermined time period so that the new display object information disappears from the display window of the LCD screen 21A after the predetermined time period elapses.

As described above, when the control apparatus 11 receives the display object information via the communication apparatus 13, the control apparatus 11 controls the speaker 23B to output the notification sound for the predetermined time period and controls the light emitting unit 23A to emit light until the driver pays attention to the LCD screen 21A. When the control apparatus 11 determines that the driver pays attention to the LCD screen 21A, the control apparatus 11 displays the display object information on the LCD screen 21A.

With above-described configuration, when the driver missed a chance to notice the information update on the LCD screen 21A, a difficulty in notifying updated information displayed on the LCD screen 21A is restricted for the driver.

With the display system 1 according to the present embodiment, a confirmation failure of the information update on the LCD screen 21A, which is caused by a carelessness of the driver, is restricted. That is, the updated information displayed on the LCD screen 21A is easily and surely notified to the driver.

In the present embodiment, the light emitting unit 23A emits light until the driver pays attention to the LCD screen 21A. Further, the control apparatus 11 may control the light emitting unit 23A to emit light for a predetermined time period, similar to the outputting of the notification sound from the speaker 23B. In this configuration, the control apparatus 11 may control the light emitting unit 23A to emit light for the predetermined time period at 5120, and skip S170. That is, the control apparatus 11 may turn off the light emitting unit 23A after the predetermined time period elapses so that the light emitting unit 23A stops emitting light.

Further, when the control apparatus 11 performs the prenotification operation, the control apparatus 11 may control the light emitting unit 23A to blink instead of continuously emitting light. Further, the control apparatus 11 may control the speaker 23B to output the notification sound until the driver pays attention to the LCD screen 21A, similar to the light emitting performed by the light emitting unit 23A.

In the present embodiment, the prenotification operation is achieved by light emitting performed by the light emitting unit 23A and notification sound output by the speaker 23B. The prenotification operation may also be achieved by the following methods. For example, a vibration apparatus may be disposed at a portion which is contacted with a part of a body of the driver. For example, the vibration apparatus may be disposed on the steering wheel or the driver seat of the vehicle. Then, the prenotification may be notified to the driver by a vibration generated by the vibration apparatus. Further, the prenotification operation may be performed by increasing a brightness of the LCD screen 21A or changing a background color of the display window of the LCD screen 21A to highlighted color.

In the present embodiment, the line of sight of the driver is detected in order to determine whether the driver pays attention to the LCD screen 21A. Further, a face orientation of the driver may be detected in order to determine whether the driver pays attention to the LCD screen 21A. Thus, the display system 1 may include a face orientation detection apparatus instead of the eye tracking apparatus 17.

(Modification)

Figure 5:
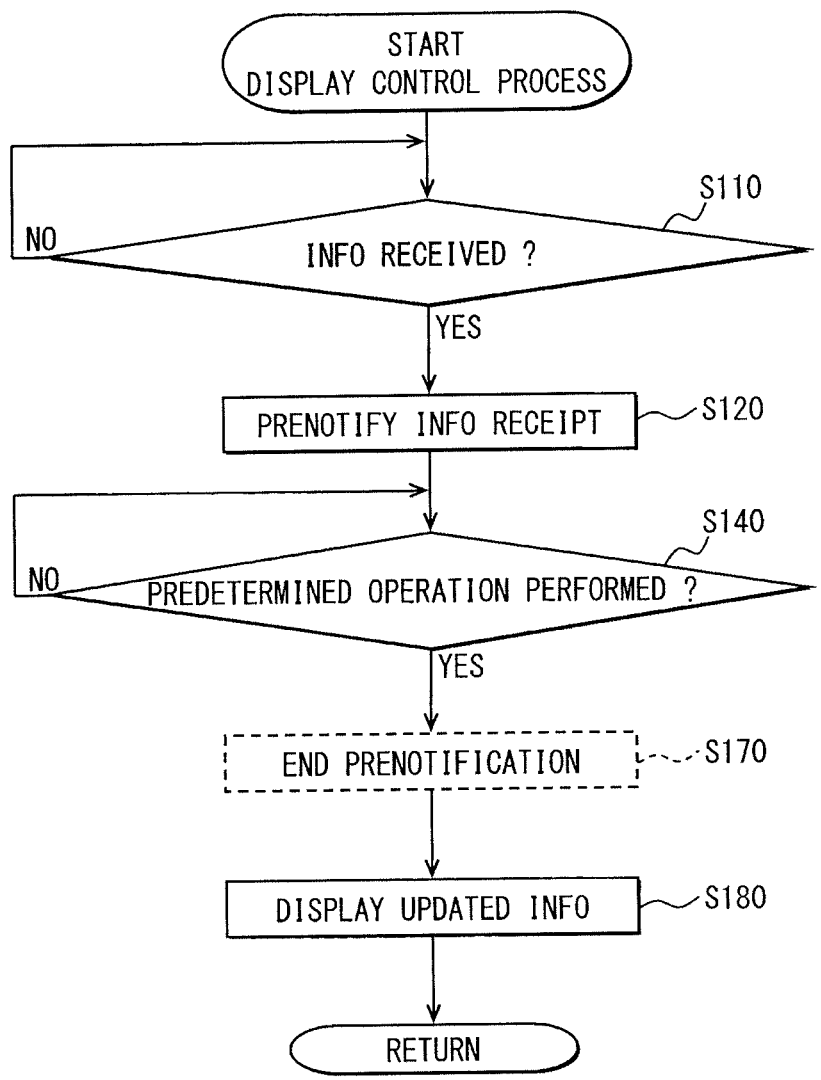
FIG. 5 is a flowchart showing a display control process executed by a control apparatus of a display system according to a modification of the first embodiment.

The following will describe a modification of the display system 1 according to the present embodiment with reference to FIG. 5. In the display system 1 according to this modification, the control apparatus 11 executes the display control process shown in FIG. 5 instead of the display control process shown in FIG. 4. As shown in FIG. 5, the control apparatus 11 executes S140 instead of S130 in FIG. 4. The following will mainly describe different parts of the display control process according to the present modification compared with the display control process according to the first embodiment.

After the control apparatus 11 performs the prenotification operation at 5120, the control apparatus 11 determines whether the driver performs a predetermined operation at S140. When the control apparatus 11 determines that the driver performs the predetermined operation (S140: YES), the control apparatus 11 ends the prenotification operation at S170, and controls the LCD screen 21A to update the display information so that the new display object information is displayed on the display window of the LCD screen 21A at S180.

The predetermined operation performed at S140 is an operation performed by the driver in order to inform the control apparatus 11 that the driver is paying attention to the LCD screen 21A. The predetermined operation may include a manipulation performed to the operation input apparatus 15 or an audio instruction made by inputting a speech to the speech recognition apparatus 16.

The display system 1 according to the present modification updates the display window of the LCD screen 21A under a condition that the driver performs the predetermined operation. Thus, with the display system 1 according to the present modification, when the driver misses a chance to notice the information update on the LCD screen 21A, a difficulty in notifying updated information displayed on the LCD screen 21A is restricted.

In the display system 1 according to the present embodiment and the modification, the LCD screen 21A is provided as an example of a display screen. The processes executed by the control apparatus 11 at 5120, 5170 and the process executed by the prenotification apparatus 23 correspond to an example of a notification section. The processes executed by the control apparatus 11 at S130, S140 correspond to an example of a determination section. The processes executed by the control apparatus 11 at S180 correspond to an example of a display control section.

(Second Embodiment)

The following will describe a display system 1 according to a second embodiment of the present disclosure. In the display system 1 according to the present embodiment, the display control process executed by the control apparatus 11 is different from the display control process executed by the control apparatus 11 of the display system 1 according to the first embodiment. Thus, the following will mainly describe the display control process executed by the control apparatus 11 according to the present embodiment.

Figure 6:
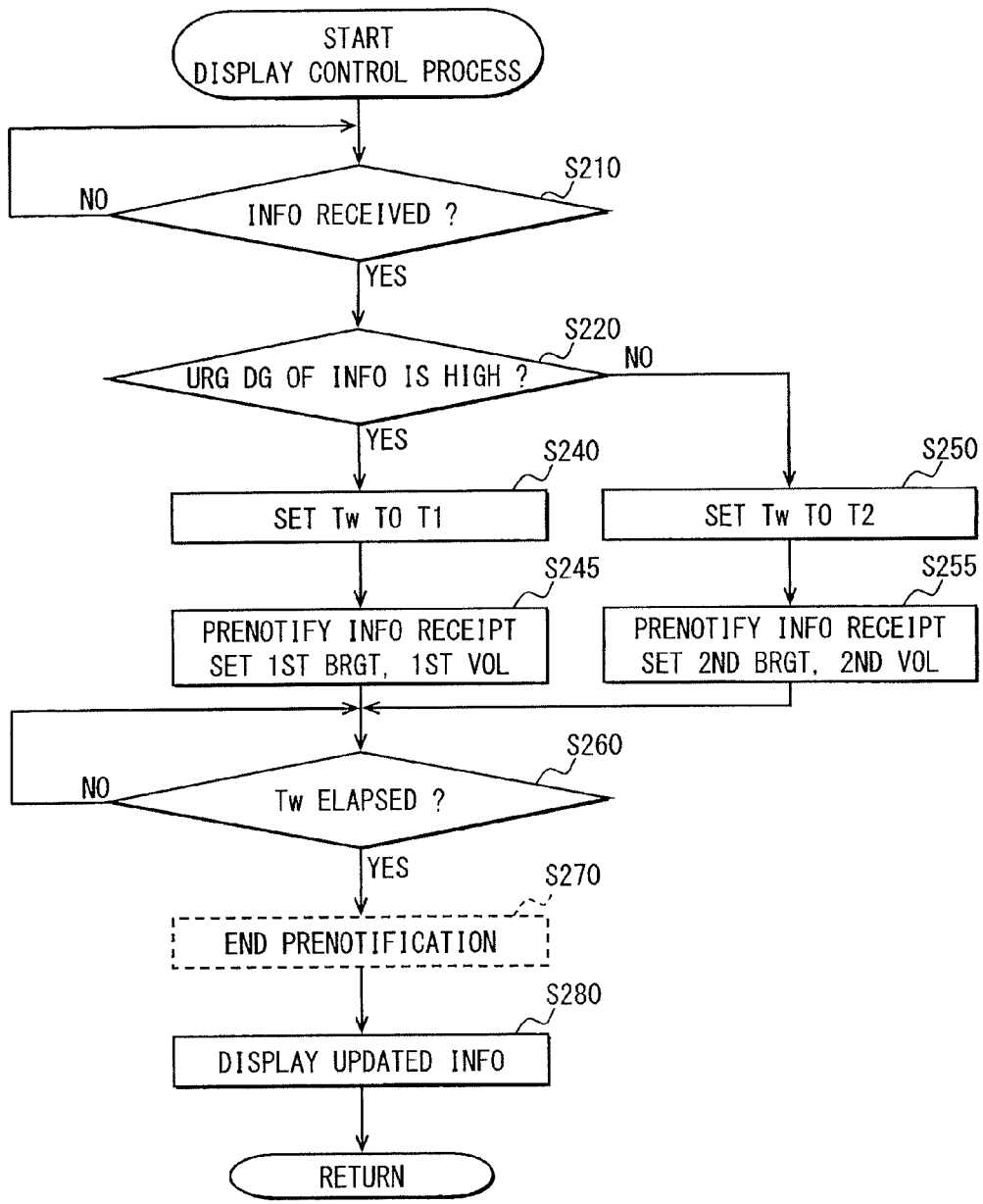
FIG. 6 is a flowchart showing a display control process executed by a control apparatus of a display system according to a second embodiment of the present disclosure.

In the present embodiment, the control apparatus 11 repeatedly executes the display control process shown in FIG. 6. When the control apparatus 11 starts the display control process, the control apparatus 11 is in the standby state until the control apparatus 11 receives the display object information from the external apparatus 100 via the communication apparatus 13 at S210.

When the control apparatus 11 receives the display object information at S210 (S210: YES), the control apparatus 11 determines an urgency degree (URG DG) of the display object information at S220. In the present embodiment, the display object information are classified into display object information having a high urgency degree and display object information having a low urgency degree. The high urgency degree is a degree equal to or greater than predetermined criteria, and the low urgency degree is a degree lower than the predetermined criteria. The control apparatus 11 determines the urgency degree of the new information received from the external apparatus 100.

For example, the display object information indicating a receipt of electronic mails may be classified into the information having the low urgency degree. Further, the traffic accident information, the traffic regulation information, and the emergency disaster information related to a route ahead of the vehicle may be classified into the information having the high urgency degree. The urgency degree may be originally set for each display object information. Further, the control apparatus 11 may determine the urgency degree of each display object information based on the predetermined criteria.

When the control apparatus 11 determines that the urgency degree of the display object information received from the external apparatus 100 is high (S220: YES), the control apparatus 11 proceeds to S240. At S240, the control apparatus 11 sets a standby time period Tw as a first time period T1, which is preliminarily determined. The first time period T1 is shorter than a second time period T2, which will be described later. The first time period T1 may also be set to zero. The standby time period is also referred to as a standby time, the first time period T1 is also referred to as a first standby time, and the second time period T2 is also referred to as a second standby time.

At S245, the control apparatus 11 controls the prenotification apparatus 23 to preliminarily notify the driver of the information update to be performed on the LCD screen 21A. Specifically, the prenotification apparatus 23 controls the light emitting unit 23A to emit light at a first brightness (BRGT) and controls the speaker 23B to output the notification sound at a first volume (VOL). Herein, the first bright brightness of the light emitting unit 23A and the first volume of the speaker 236 are preliminarily determined. Further, the first brightness is greater than a second brightness (BRGT), which will be described later, and the first volume is greater than a second volume (VOL), which will be described later.

When the control apparatus 11 determines that the urgency degree of the display object information received from the external apparatus 100 is low (S220: NO), the control apparatus 11 proceeds to S250. At S250, the control apparatus 11 sets the standby time period Tw as the second time period T2, which is preliminarily determined. As described above, the second time period T2 is longer than the first time period T1.

At S255, the control apparatus 11 controls the prenotification apparatus 23 to preliminarily notify the driver of the information update to be performed on the LCD screen 21A. Specifically, the prenotification apparatus 23 controls the light emitting unit 23A to emit light at the second brightness and controls the speaker 23B to output the notification sound at the second volume. Herein, the second brightness of the light emitting unit 23A and the second volume of the speaker 236 are preliminarily determined. As described above, the second brightness is smaller than the first brightness, and the second volume is smaller than the first volume.

At S260, the control apparatus 11 waits until the standby time Tw, which is set at S240 or S250, elapses. When the standby time Tw elapses (S260: YES), the control apparatus 11 ends the prenotification operation at S270, and controls the LCD screen 21A to update the display information at S280 so that the new display object information is displayed on the display window of the LCD screen 21A. The processes executed at S270 and S280 are similar to the processes executed at S170 and S180.

In the present embodiment, the prenotification is performed in a different manner from the first embodiment. Specifically, in the present embodiment, the prenotification is performed according to the urgency degree of the display object information to be displayed on the LCD screen 21A. Further, the standby time Tw for prenotifying the information update to be performed on the LCD screen 21A is set differently based on the urgency degree of the display object information.

Commonly, the information having the high urgency degree is preferable to be notified to the driver at an early time. Usually, the driver may be highly interested in the information having the high urgency degree. In the present embodiment, when performing the prenotification of the information having the high urgency degree, the brightness of the light emitting unit 23A and the volume of the speaker 23B are set greater than a case in which the prenotification of the information having the low urgency is performed. Thus, the driver is more likely to pay attention to the prenotification. Thus, the display system 1 according to the present embodiment increases a possibility that the driver promptly pays attention to the display window of the LCD screen 21A for the information having the high urgency degree after the prenotification is performed. As described above, since the driver may promptly pay attention to the LCD screen 21A after the prenotification of the information having the high urgency degree is performed, the standby time Tw (T1) for the prenotification operation of the high urgency degree information is set shorter than the standby time Tw (T2) for the prenotification operation of the low urgency information.

With the display system 1 according to the present embodiment, when the driver misses a chance to notice the information update on the LCD screen 21A, a difficulty in notifying updated information displayed on the LCD screen 21A is restricted. Further, the updated information is displayed on the LCD screen 21A at a proper time according to a type of the display object information. Herein, the type of the display object information is the urgency degree of the display object information.

In the present embodiment, as described above, the prenotification is performed in different modes according to the type of the display object information so that the information having different urgency degrees are notified to the driver in an easy to understand way. Further, the different modes of the prenotification may be switched to each other corresponding to the urgency degree of the display object information so that the driver is able to distinguish the urgency degree of the display object information. However, when the display object information having the high urgency degree is displayed on the LCD screen 21A, the driver is highly possible to pay attention to the LCD screen 21A even though a process for quickly attracting an attention of the driver, such as increasing the volume output from the speaker 23B, is not performed. Thus, the prenotification made according to the urgency degree of the display object information may be performed in a different way from the above-described way.

In the present embodiment, the display object information is classified based on the urgency degree. Further, the information may be classified based on a request of the driver. For example, when the information received from the external apparatus 100 is the information requested by the driver, the information is classified into requested information. Further, when the information received from the external apparatus 100 is information other than the requested information, that is, the received information is not requested by the driver, the information is classified into non-requested information.

(Modification)

Figure 7:
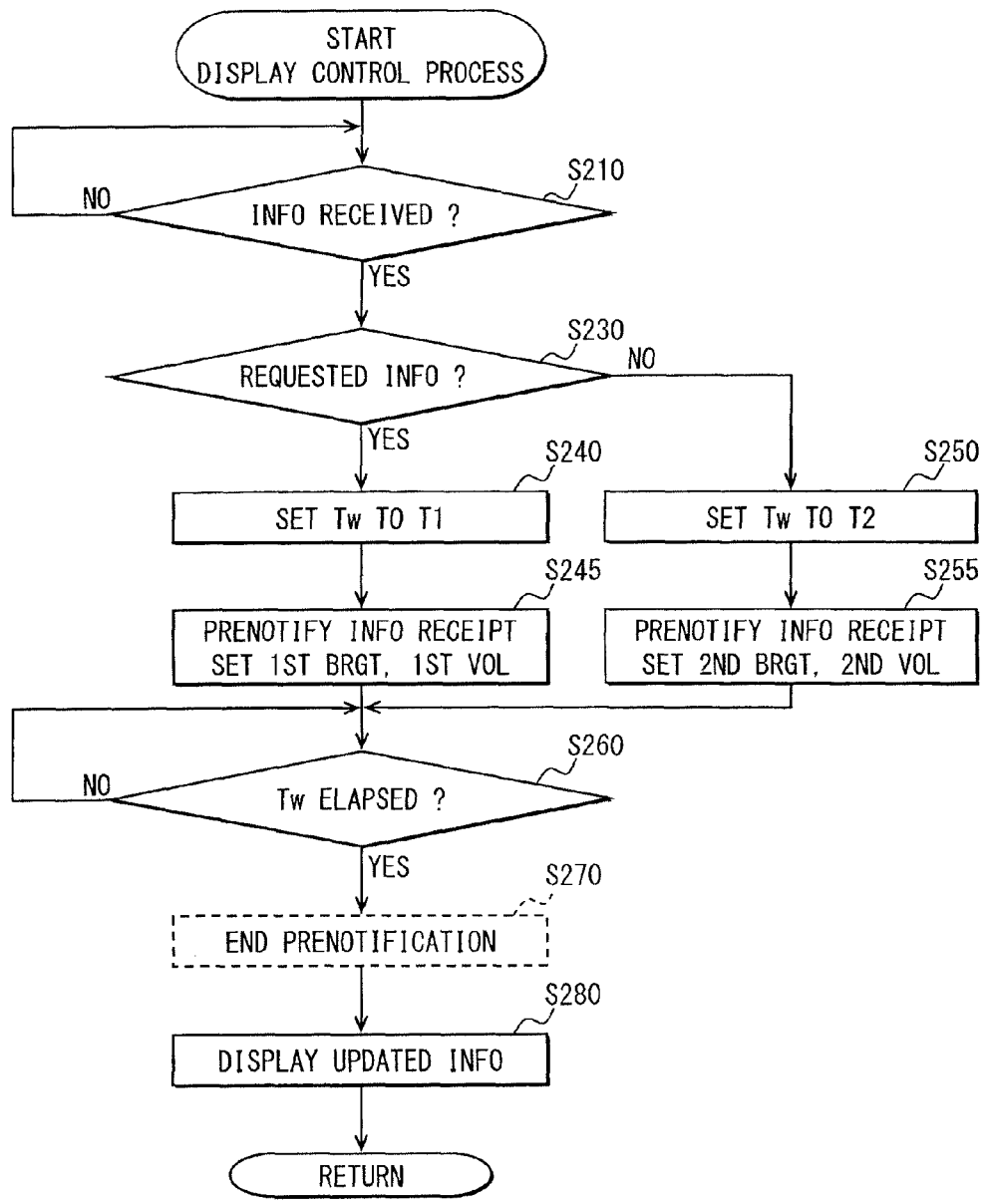
FIG. 7 is a flowchart showing a display control process executed by a control apparatus of a display system according to a modification of the second embodiment.

The following will describe a display system 1 according to a modification of the second embodiment with reference to FIG. 7. In the display system 1 according to this modification, the control apparatus 11 executes the display control process shown in FIG. 7 instead of the display control process shown in FIG. 6. As shown in FIG. 7, the control apparatus 11 according to the present modification executes S230 instead of S220 shown in FIG. 6.

As shown in FIG. 7, when the control apparatus 11 receives the display object information (S210: YES), the control apparatus 11 determines whether the display object information is transmitted from the external apparatus 100 in response to a request made by the driver at S230. That is, the control apparatus 11 determines whether the display object information is the requested information or the non-requested information at S230. As described above, the requested information is the display object information transmitted from the external apparatus 100 in response to a transmission request made by the driver. Herein, the transmission request made by the driver is a trigger for obtaining the display object information from the external apparatus 100.

As described above, in the display system 1 according to the present modification, the control apparatus 11 classifies the display object information based on the transmission request made by the driver. For example, the weather information requested by the driver and the weather information obtained based on a predetermined schedule are classified into different types of information. The driver may also make a transmission request for the electronic mails to the external apparatus 100.

At S230, when the control apparatus 11 determines that the display object information is the requested information (S230: YES), the control apparatus 11 proceeds to S240. At S240, the control apparatus 11 sets the standby time Tw for the prenotification of the requested information to the first time period T1, which is shorter than the second time period T2.

At S230, when the control apparatus 11 determines that the display object information is the non-requested information (S230: NO), the control apparatus 11 proceeds to S250. At S250, the control apparatus 11 sets the standby time Tw for the prenotification of the requested information to the second time period T2 so that the standby time Tw for the prenotification of the non-requested information is longer than the standby time Tw for the prenotification of the requested information.

As described above, the control apparatus 11 sets two different standby time T1, T2 for the requested information and the non-requested information, respectively. Then, the control apparatus 11 controls the prenotification apparatus 23 to perform the prenotification in different modes according to the type of the display object information at S245 and S255. That is, the prenotification apparatus 23 performs the prenotification in the mode, which varies according to the type of the display object information.

After the driver makes a request for some information, the driver is more likely to wait for the display of the requested information. Thus, it is preferable to display the information requested by the driver at an early time. When the driver waits for the display of the requested information, the driver may intermittently pay attention to the LCD screen 21A. Thus, the driver is more likely to notice the information update on the LCD screen 21A. Thus, in this modification, the standby time Tw (T1) for the prenotification of the requested information is set shorter than the standby time Tw (T2) for the prenotification of the non-requested information. That is, the display of the requested information on the LCD screen 21A is performed earlier than the display of the non-requested information.

With the display system 1 according to the present modification, when the driver misses a chance to notice the Information update on the LCD screen 21A, a difficulty in notifying updated information displayed on the LCD screen 21A is restricted. Further, the new information is displayed on the LCD screen 21A at a proper time according to a type of the new information. Herein, the type of the new information is determined based on the request made by the driver.

Further, in the display system 1 according to the present modification, as shown in S245 and S255 of FIG. 7, the prenotification of the requested information is performed in a different mode from a mode in which the prenotification of the non-requested information is performed. Further, since the driver is able to roughly determine the type of the display object information even when the prenotification of the requested information and the prenotification of the non-requested information are performed in the same mode, the prenotification of the requested information and the non-requested performed may be performed in the same mode.

Thus, the control apparatus 11 may perform the prenotification of the display object information in the same prenotification mode regardless of the type of the display object information, instead of differently performing the prenotification at S245 and S255.

In the display system 1 according to the second embodiment and the modification thereof, the LCD screen 21A is described as an example of a display screen. The processes executed by the control apparatus 11 at S244, S255, S270 and the process executed by the prenotification apparatus 23 correspond to an example of a notification section. The processes executed by the control apparatus 11 at S220, S230, S240, S250 correspond to an example of a setting section. The processes executed by the control apparatus 11 at S260, S280 correspond to an example of a display control section, (Other Embodiments)

In the foregoing embodiments and modifications, the display object information is classified into the information having the high urgency degree and the information having the low urgency degree, or the display object information is classified into the requested information and the non-requested information. Further, the display object information may be classified into four types including the information having the high urgency degree, the information having the low urgency degree, the requested information, and the non-requested information. The display system 1 may perform the prenotification for the display object information in a mode, which varies according to the type of the display object information. Further, the display system 1 may set the standby time Tw, which varies according to the type of the display object information, for the prenotification of each display object information.

Further, in the foregoing embodiments and modifications, the display system 1 is mainly used for displaying information for the driver. Further, the display system 1 according to the present disclosure is also applied to a display system that displays information for a vehicle occupant including the driver. In the display system that displays information for the vehicle occupant including the driver, the type of the display object information may be classified based on a target to who the information is to be displayed. For example, the prenotification mode and the standby time Tw may be set differently for the information displayed to the vehicle occupant other than the driver and the information displayed to the driver only.

The present disclosure includes the following aspects.

The display system 1 according to an aspect of the present disclosure is equipped to the vehicle, and includes the display screen 21A, the notification section 11, 23, the determination section 11, and the display control section 11. The display screen 21A displays the information for the vehicle occupant. The notification section 11, 23 preliminarily notifies the vehicle occupant of the information update to be performed on the display screen 21A. The determination section 11 determines whether the vehicle occupant pays attention to the display screen 21A after the notification section 11, 23 notifies of the information update. The display control section 11 performs the information update in order to display the new information on the display screen 21A when the determination section determines that the vehicle occupant pays attention to the display screen 21A.

With above-described display system 1, the information update performed on the display screen 21A is preliminarily notified to the vehicle occupant. Then, the information update is maintained until the vehicle occupant pays attention to the display screen 21A. Thus, a case in which the vehicle occupant misses the information update on the display screen 21A is restricted. Accordingly, the vehicle occupant is surely and easily notified of the information update on the display screen 21A.

Further, the determination section 11 may determine whether the vehicle occupant pays attention to the display screen 21A by monitoring at least one of the line of sight or the face orientation of the vehicle occupant. Thus, the display system 1 is able to perform the information update at a proper timing even without an explicit instruction or a command made by the vehicle occupant.

Further, the determination section 11 may determines that the vehicle occupant pays attention to the display screen 21A when the predetermined operation is performed by the vehicle occupant to the operation input apparatus 15.

The display system 1 according to another aspect of the present disclosure is equipped to the vehicle, and includes the display screen 21A, the notification section 11, 23, the setting section 11, and the display control section 11. The display screen 21A displays information for the vehicle occupant. The display control section 11 performs the information update in order to display new information on the display screen 21A The notification section 11, 23 preliminarily notifies the vehicle occupant of the information update to be performed on the display screen 21A by the display control section. The setting section sets the standby time Tw for the new information. The standby time Tw varies according to the type of the new information. When the standby time Tw set for the new information elapses after the notification section 11, 23 starts notifying of the information update, the display control section 11 performs the information update and displays the new information on the display screen 21A.

The vehicle occupant has different interest level to the information displayed on the display screen 21A. Thus, the standby time is set according to the type of the new information to be displayed on the display screen 21A. Thus, the information update is performed when the standby time set according to the type of the new information elapses. With this configuration, the information update is performed at a proper timing, and a case in which the vehicle occupant misses the information update on the display screen 21A is restricted.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A display system equipped to a vehicle comprising:
   a display screen displaying an information for a vehicle occupant;
   a display control section performing an information update in order to display a new information on the display screen;
   a notification section preliminarily notifying the vehicle occupant of the information update to be performed on the display screen by the display control section; and
   a setting section setting a standby time for the new information immediately from a time the new information is received, the standby time varying according to a type of the new information, the standby time is set to be equal for each information having a same type,
   wherein, when the standby time set for the new information elapses after the notification section starts notifying of the information update, the display control section performs the information update and displays the new information on the display screen,
   wherein the notification section is configured to notify the vehicle occupant of the information update to be performed on the display screen by the display control section immediately after the notification section receives the information update,
   wherein the notification section preliminarily notifies the vehicle occupant on the display screen of the information update,
   wherein, when the new information has an urgency degree equal to or higher than a predetermined criteria, the setting section sets a first standby time for the new information, wherein, when the new information has an urgency degree lower than the predetermined criteria, the setting section sets a second standby time for the new information, and wherein the first standby time is shorter than the second standby time.

2. The display system according to claim 1, wherein the notification section notifies the vehicle occupant of the information update to be performed on the display screen in a notification mode, which varies according to the type of the new information.

3. The display system according to claim 1, wherein, when the new information is a requested information that is requested by the vehicle occupant, the setting section sets a first standby time for the new information, wherein, when the new information is an information other than the requested information, the setting section sets a second standby time for the new information, and wherein the first standby time is shorter than the second standby time.

4. The display system according to claim 1, further comprising:
   at least one of a light emitting unit that emits light, a speaker that outputs a sound, or a vibration apparatus that generates a vibration,
   wherein the notification section notifies the vehicle occupant of the information update by at least one of the light emitted by the light emitting unit, the sound output by the speaker, or the vibration generated by the vibration apparatus.

5. The display system according to claim 1, wherein the notification section is proximate to the display screen.

6. The display system according to claim 1, wherein the display screen and the notification section are both formed proximate to a driver seat in the vehicle.

* * * * *